United States Patent
Endres

(10) Patent No.: US 10,793,155 B2
(45) Date of Patent: Oct. 6, 2020

(54) METHOD AND DEVICE FOR DIGGING OUT A MOTOR VEHICLE

(71) Applicant: Robert Bosch GmbH, Stuttgart (DE)

(72) Inventor: Marcus Endres, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 138 days.

(21) Appl. No.: 16/087,733

(22) PCT Filed: Mar. 10, 2017

(86) PCT No.: PCT/EP2017/055676
§ 371 (c)(1),
(2) Date: Sep. 24, 2018

(87) PCT Pub. No.: WO2017/186398
PCT Pub. Date: Nov. 2, 2017

(65) Prior Publication Data
US 2019/0084567 A1   Mar. 21, 2019

(30) Foreign Application Priority Data
Apr. 29, 2016 (DE) .................. 10 2016 207 336

(51) Int. Cl.
*B60W 30/18* (2012.01)
*B60K 28/16* (2006.01)
*B60W 30/09* (2012.01)

(52) U.S. Cl.
CPC ....... *B60W 30/18045* (2013.01); *B60K 28/16* (2013.01); *B60W 30/09* (2013.01); *B60W 30/18* (2013.01); *B60W 30/18172* (2013.01)

(58) Field of Classification Search
CPC .......... B60W 30/18045; B60W 30/18; B60W 30/09; B60W 30/18172;
(Continued)

(56) References Cited

U.S. PATENT DOCUMENTS

2006/0237249 A1* 10/2006 Steen .................. B60K 28/165
180/198
2015/0291166 A1    10/2015 Mair

FOREIGN PATENT DOCUMENTS

DE    102008036048 A1    2/2010
DE    102009036058 A1    2/2011
(Continued)

OTHER PUBLICATIONS

International Search Report for PCT/EP2017/055676, dated Jun. 21, 2017.

*Primary Examiner* — Jess Whittington
*Assistant Examiner* — Brian E Yang
(74) *Attorney, Agent, or Firm* — Norton Rose Fulbright US LLP; Gerard Messina

(57) ABSTRACT

A method for digging out a motor vehicle at a standstill, in which the driver predefines a startup direction for the motor vehicle with the aid of an operating element; in which a reciprocating motion of the motor vehicle is generated with the aid of chronologically consecutive drive force pulses which are independent of the driver and have a first intensity; in which the spatial amplitude of the reciprocating motion is ascertained and compared to a predefined threshold value; and when the spatial amplitude of the reciprocating motion of the motor vehicle exceeds the threshold value, a startup movement of the motor vehicle is subsequently generated in the predefined startup direction using at least one drive force pulse which is directed in the predefined startup direction and which has a second intensity, which is greater than the first intensity.

11 Claims, 3 Drawing Sheets

(58) Field of Classification Search
CPC ..... B60W 2510/0657; B60W 2520/30; B60W 2720/30; B60W 30/18027; B60W 30/095; B60W 10/10; B60K 28/16; B60Y 2400/301; B60Y 2300/095
See application file for complete search history.

(56) References Cited

FOREIGN PATENT DOCUMENTS

| | | |
|---|---|---|
| DE | 102010043250 A1 | 5/2012 |
| DE | 102013218664 A1 | 3/2015 |
| DE | 102014207081 A1 | 10/2015 |
| JP | 2012067772 A | 4/2012 |

\* cited by examiner

METHOD AND DEVICE FOR DIGGING OUT A MOTOR VEHICLE

BACKGROUND INFORMATION

A method for rocking a vehicle free using an automatic or automated transmission is described in German Patent Application No. DE 10 2010 043 250 A1, a drive torque acting in a setpoint travel direction being alternatingly built up and relieved at the driven wheels for the purpose of rocking the vehicle free after recognizing an operating situation in which the vehicle is to be rocked free.

SUMMARY

The present invention relates to a method for digging out or rocking free or starting up a motor vehicle at a standstill,
  in which the driver predefines a startup direction for the motor vehicle with the aid of an operating element,
  in which a reciprocating motion of the motor vehicle is generated with the aid of chronologically consecutive drive force pulses which are independent of the driver and have a first intensity,
  in which the spatial amplitude of the reciprocating motion is ascertained and compared to a predefined threshold value, and
  when the spatial amplitude of the reciprocating motion of the motor vehicle exceeds the threshold value, a startup movement of the motor vehicle is subsequently generated in the predefined startup direction using at least one drive force pulse which is directed in the predefined startup direction and which has a second intensity, which is greater than the first intensity.

In this way, the driver is presented with a possibility to still move the vehicle, even in the case of a vehicle which is bogged down or stuck in a terrain which is difficult, in particular iced over, muddy or snow covered. The term "digging out" is in this case understood to mean freeing a motor vehicle under the vehicle's own power from a difficult startup situation with regard to the friction coefficient.

One advantageous example embodiment of the present invention is characterized in that the drive force pulses of the first intensity are directed in the predefined startup direction.

One advantageous example embodiment of the present invention is characterized in that the drive force pulses of the first intensity are directed alternatingly in the predefined startup direction and opposite to the predefined startup direction. In this way, a rocking motion of the vehicle may be generated.

One advantageous example embodiment of the present invention is characterized in that the direction in which the drive force pulses act is predefined by controlling the transmission of the motor vehicle.

One advantageous example embodiment of the present invention is characterized in that the motor vehicle includes distance sensors and the amplitude excursion of the path of the motor vehicle opposite to the predefined startup direction is delimited during the reciprocating motion with the aid of brake interventions in such a way that a collision of the motor vehicle with an adjacent object, which was detected by the distance sensors, does not take place. For this purpose, distance sensors which are already included in numerous vehicles may be used.

One advantageous example embodiment of the present invention is characterized in that the amplitude excursion of the motor vehicle is delimited in such a way that a minimum distance to the object is not fallen below.

One advantageous example embodiment of the present invention is characterized in that the direction of the drive force pulses of the first intensity is reversed if the path covered by the motor vehicle, after a time interval of a predefined length has elapsed, has fallen below a predefined threshold value.

One advantageous example embodiment of the present invention is characterized in that the direction of the drive force pulses is reversed if the motor vehicle does not move during a time interval of a predefined length even though an engine torque is applied.

Furthermore, the present invention includes a device, including means which are configured to carry out the method according to the present invention. This involves, in particular, a control unit in which the program code for carrying out the method according to the present invention is stored.

DETAILED DESCRIPTION OF EXAMPLE EMBODIMENTS

The present invention describes provides a digging-out logic or a shoveling-free logic for a motor vehicle and is suitable for driving situations in which the motor vehicle cannot continue to move as a result of the ground condition even with the aid of a traction control system and is stuck or bogged down. Such a ground condition may be, for example, deep snow, ice, or mud. By applying engine torque pulses and, possibly, additionally influencing the clutch in a targeted manner, the vehicle is iteratively supplied with kinetic energy which eventually results in the desirable startup of the motor vehicle.

The present invention is suitable in particular for automatic vehicles which include distance sensors at the front and the rear ends.

The driver establishes the desirable startup direction or target driving direction of the motor vehicle with the aid of an operating element. The movement of the vehicle may be delimited by the distance sensors present at the vehicle to prevent collisions. If the vehicle has the possibility of active or driver-independent steering interventions, the present invention may also be used for automatically unparking the vehicle out of a parking spot. It is even possible to integrate the vehicle into the flowing traffic with the aid of a lane change assistance system.

The activation or enablement of the digging-out or shoveling-free function may take place with the aid of a switch, for example. It is, however, also possible to activate the function automatically when the motor vehicle is still not moving forward despite the actuation of the accelerator pedal, after a time interval of a predefined length has elapsed.

The above-named function may be aborted or not allowed when the distance to an adjacent vehicle is established to be too little or when the vehicle is located on an excessively inclined roadway in the longitudinal direction. In the latter case, the vehicle could undesirably move opposite to the desired direction in the case of an excessively strong inclination and an excessively low friction coefficient.

Figure 1:
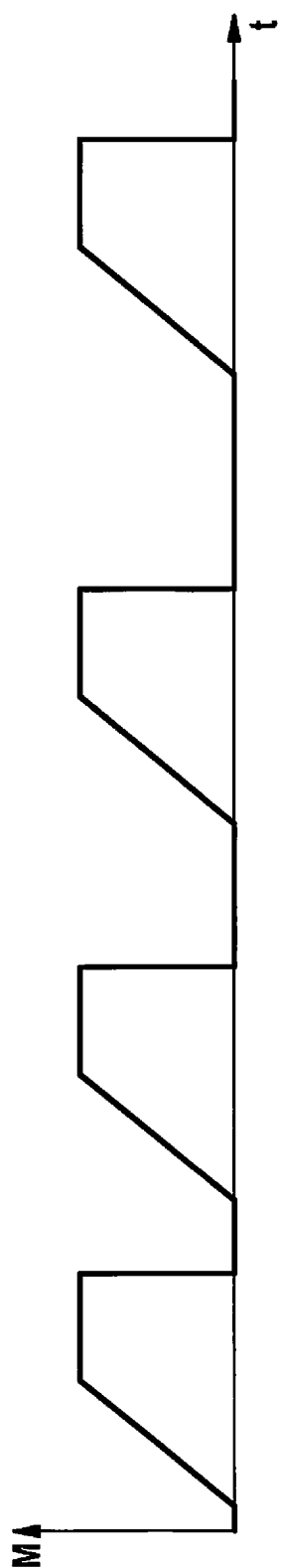
In FIG. 1, the chronological profile of engine torque pulses is illustrated.

In one specific embodiment of the present invention, engine torque pulses or drive torque pulses or drive force pulses M are applied in the beginning to the driven wheels, as is illustrated in FIG. 1, when the vehicle is at a standstill. The figure shows time t in the abscissa direction and intensity M of the drive force in the ordinate direction. These pulses are applied until either an abort criterion is met or a minor movement of the motor vehicle has taken place. Such a movement may take place, for example, via a wheel rotational speed measurement of the not driven wheels or also via a distance measurement to a stationary adjacent object or vehicle.

The optimal points in time and the optimal duration of the drive torque pulses may be ascertained through a movement analysis or a frequency analysis.

Figure 3:
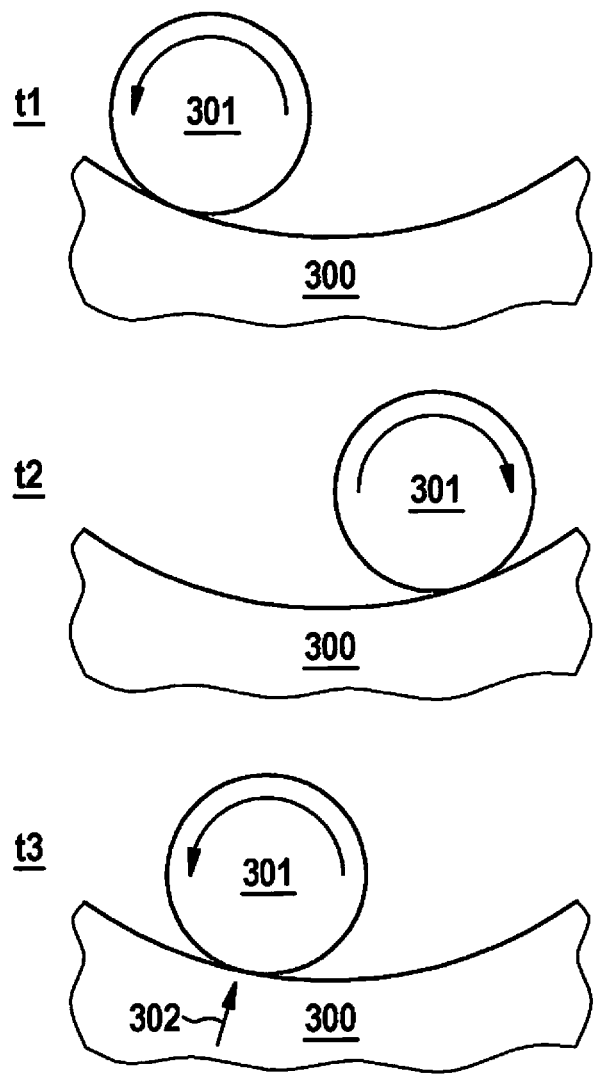
In FIG. 3, a movement analysis of a wheel movement is illustrated by way of example.

The magnitude or intensity of the drive torque pulses may be selected as a function of the ascertained friction coefficient. When the vehicle is driven by electric motors or an automatic transmission, the wheels may also be driven opposite to the desired direction for a short period of time. Such a movement analysis is illustrated in FIG. 3. It shows a depression 300 as depression as a vehicle wheel 301 at three different consecutive points in time t1, t2, and t3. Vehicle wheel 301 belongs to a vehicle (not illustrated) which may leave depression 300 to the left in the drawing plane. Up until point in time t1, the vehicle is moving to the left toward the left edge of the depression until the wheel slip, i.e., the wheel starts spinning, takes place at point in time t1. The motor vehicle does not move further forward. For this reason, a drive force pulse which is directed in the opposite direction is applied to the motor vehicle and the vehicle moves backward until another wheel slip takes place at point in time t2. Alternatively to applying the drive force pulse directed in the opposite direction, it is also possible to allow the vehicle to roll backward until it reaches its turning point at point in time t2 and subsequently rolls forward again. The points in time for applying the drive force pulses are ascertained based on the chronological intervals or the spatial distances of the turning points as well as further parameters, for example friction coefficient, wheel speed, and known down times. The down times take into consideration the time period which elapses from the drive force pulse input to the drive force pulse action on the wheel. This means that the engine torque input or the drive force pulse input is output already during the movement of the vehicle opposite to the desired direction, so that the torque is available for the movement into the desired direction. For this purpose, it is possible, for example, to establish that point at which the maximum drive torque is ideally supposed to act. This may be the point identified by arrow 302 at point in time t3. It may also be useful to adapt the start and end ramps of the drive force pulses in order to either reach a wheel slip for a very short period of time or not at all.

As soon as the motor vehicle has enough kinetic energy, it is possible to move the vehicle in the desired direction via a final, longer, and higher engine torque input.

In the case of a detected movement of the vehicle or an ever so little accelerator pedal travel predefined by the driver, it is possible to deactivate the function and to implement the driver request with regard to the engine torque.

Figure 2:
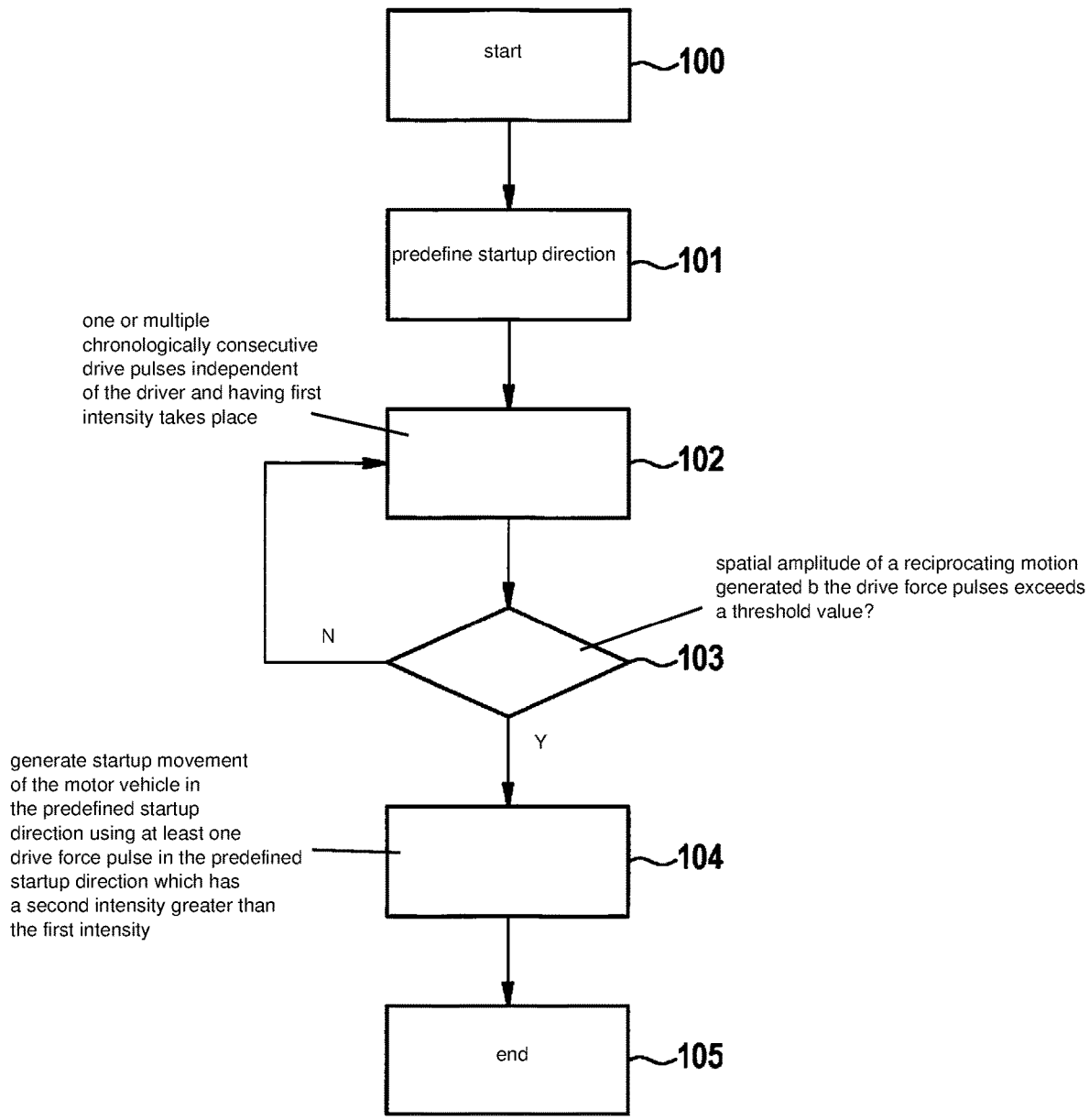
In FIG. 2, the basic sequence of one embodiment of the method is illustrated.

In FIG. 2, the basic sequence of one example embodiment of the method is illustrated. After the start in block 100, a startup direction for the motor vehicle is predefined by the driver in block 101 with the aid of an operating element.

Thereafter, in block 102 one or multiple chronologically consecutive drive force pulses which are independent of the driver and which have a first intensity take(s) place. Then, it is requested in block 103, whether the spatial amplitude of a reciprocating motion generated by the drive force pulses exceeds a threshold value. If this is not the case, the method returns to block 102. If this is the case, however, a startup movement of the motor vehicle is subsequently generated in the predefined startup direction in block 104 using at least one drive force pulse which is directed in the predefined startup direction and which has a second intensity, which is greater than the first intensity. The method ends in step 105.

What is claimed is:

1. A method for digging out a motor vehicle at a standstill, the method comprising: predefining, by a driver of the vehicle, a startup direction for the motor vehicle with the aid of an operating element; generating a reciprocating motion of the motor vehicle using chronologically consecutive drive force pulses which are independent of the driver and have a first intensity; ascertaining a spatial amplitude of the reciprocating motion; comparing the ascertained spatial amplitude to a predefined threshold; when the spatial amplitude of the reciprocating motion of the motor vehicle is greater than the predefined threshold value, generating a startup movement of the motor vehicle in the predefined startup direction using at least one drive force pulse which is directed in the predefined startup direction and which has a second intensity, which is greater than the first intensity.

2. The method as recited in claim 1, wherein the drive force pulses of the first intensity are directed in the predefined startup direction.

3. The method as recited in claim 1, wherein the drive force pulses of the first intensity are directed alternatingly in the predefined startup direction and opposite to the predefined startup direction.

4. The method as recited in claim 1, wherein the direction in which the drive force pulses act is predefined by controlling the transmission of the motor vehicle.

5. The method as recited in claim 1, wherein the motor vehicle includes distance sensors and an amplitude excursion of a path of the motor vehicle opposite to the predefined startup direction is delimited during the reciprocating motion with the aid of brake interventions in such a way that a collision of the motor vehicle with an adjacent object, which was detected by the distance sensors, does not take place.

6. The method as recited in claim 5, wherein the amplitude excursion of the motor vehicle is delimited in such a way that a minimum distance to the object is not fallen below.

7. The method as recited in claim 1, wherein a direction of the drive force pulses of the first intensity is reversed if a path covered by the motor vehicle, after a time interval of a predefined length has elapsed, has fallen below a predefined threshold value.

8. The method as recited in claim 1, wherein a direction of the drive force pulses of the first intensity is reversed if the motor vehicle does not move during a time interval of a predefined length even though an engine torque is applied.

9. The method as recited in claim 1, further comprising selecting at least one of the first intensity and the second intensity as a function of a friction coefficient.

10. A device for digging out a motor vehicle at a standstill, wherein a driver of the vehicle predefines a startup direction for the motor vehicle with the aid of an operating element, the device configured to: generate a reciprocating motion of the motor vehicle using chronologically consecutive drive force pulses which are independent of the driver and have a first intensity; ascertain a spatial amplitude of the reciprocating motion; compare the ascertained spatial amplitude to a predefined threshold; when the spatial amplitude of the reciprocating motion of the motor vehicle is greater than the predefined threshold value, generate a startup movement of the motor vehicle in the predefined startup direction using at least one drive force pulse which is directed in the predefined startup direction and which has a second intensity, which is greater than the first intensity.

11. The device as recited in claim 10, wherein at least one of the first intensity and the second intensity is selected as a function of a friction coefficient.

\* \* \* \* \*